United States Patent
Nguyen et al.

(10) Patent No.: US 9,544,102 B2
(45) Date of Patent: Jan. 10, 2017

(54) DL SCHEDULING AND HARQ-ACK FEEDBACK FOR DL TRANSMISSIONS IN FLEXIBLE-TDD SYSTEMS WITHOUT AND WITH CROSS-SUBFRAME SCHEDULING

(71) Applicant: NEC Corporation, Tokyo (JP)

(72) Inventors: Phong Nguyen, Victoria (AU); Yuanrong Lan, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/425,195

(22) PCT Filed: May 29, 2014

(86) PCT No.: PCT/JP2014/065020
§ 371 (c)(1),
(2) Date: Mar. 2, 2015

(87) PCT Pub. No.: WO2014/196616
PCT Pub. Date: Dec. 11, 2014

(65) Prior Publication Data
US 2015/0263829 A1 Sep. 17, 2015

(30) Foreign Application Priority Data
Jun. 4, 2013 (AU) ................. 2013902001

(51) Int. Cl.
*H04L 1/18* (2006.01)
*H04L 5/00* (2006.01)
*H04W 72/12* (2009.01)

(52) U.S. Cl.
CPC .......... *H04L 1/1896* (2013.01); *H04L 1/1861* (2013.01); *H04L 5/0055* (2013.01); *H04W 72/1278* (2013.01); *H04W 72/1289* (2013.01)

(58) Field of Classification Search
CPC .... H04L 1/1896; H04L 1/1861; H04L 5/0055; H04W 72/1278; H04W 72/1289
(Continued)

(56) References Cited

U.S. PATENT DOCUMENTS

| 2010/0165939 | A1 | 7/2010 | Lin |
| 2011/0274060 | A1* | 11/2011 | Luo .................. H04L 5/0062 370/329 |
| 2013/0016676 | A1 | 1/2013 | Lohr et al. |

FOREIGN PATENT DOCUMENTS

JP 2013-520052 A 5/2013

OTHER PUBLICATIONS

International Search Report, corresponding to PCT/JP2014/065020, dated Aug. 2, 2014, 2 pages.
(Continued)

*Primary Examiner* — Ronald B Abelson
(74) *Attorney, Agent, or Firm* — Wilmer Cutler Pickering Hale and Dorr LLP

(57) ABSTRACT

There is provided methods for use in control signaling in advanced wireless communication systems that support flexible allocation of TDD UL-DL configurations. Where HARQ-ACK bundling is used, PDCCH/EPDCCH transmissions indicating DL SPS release and PDSCH transmissions with corresponding PDCCH/EPDCCH are scheduled only on DL and/or special subframes in a DL association set which are not after the subframe in the DL association set carrying an UL grant. Where HARQ-ACK multiplexing is used, the value of the DL assignment index ($V_{DAI}^{UL}$) is set to the number of subframes in the DL association set. Cross-subframe scheduling is also used.

22 Claims, 9 Drawing Sheets

(58) Field of Classification Search
USPC .......................................................... 370/280
See application file for complete search history.

(56) References Cited

OTHER PUBLICATIONS

3GPP TS 36.211 v10.5.0, "3rd Generation Partnership Project; Technical Specification Group Radio Access Network; Evolved Universal Terrestrial Radio Access (E-UTRA); Physical Channels and Modulation" (Release 10) Jun. 2012, 101 pages.

3GPP TS 36.213 v8.8.0, "3rd Generation Partnership Project; Technical Specification Group Radio Access Network; Evolved Universal Terrestrial Radio Access (E-UTRA); Physical layer procedures (Release 8)" (Sep. 2009), 77 pages.

3GPP TSG-RAN WG1 Meeting #68bis, R1-121200, "Cross-subframe scheduling by ePDDCH for large PDSCH size," Fujitsu, Mar. 26, 2012, 3 pages.

3GPP TSG-RAN WG1 #70, RI-123258, (Aug. 13, 2012), "Remaining Issues for HARQ-ACK reporting on PUSCH adjusted by UL grant for TDD inter-band CA," Sharp, 4 pages.

3GPP TSG RAN WG1 Meeting #73, R1-132331, "Reconfiguration signaling for TDD eIMTA system", NEC Group, (May 20, 2013), 3 pages.

3GPP TSG-RAN WG1 #73, R1-132024, "On efficient signaling of Dynamic TDD", Ericsson, ST-Ericsson, (May 20, 2013), 3 pages.

LG Electronics, "TDD DL-UL Reconfiguration Methods for eIMTA," 3GPP Draft, R1-122318, 3rd Generation Partnership Project (3GPP), Mobile Competence Centre, France, vol. RAN WG1, pp. 20120521-20120525 (May 12, 2012).

Partial Supplementary European Search Report issued by the European Patent Office for Application No. 14808380.1 dated Mar. 16, 2016 (9 pages).

* cited by examiner

Fig. 7

| DAI<br>MSB, LSB | $V_{DAI}^{UL}$ or $V_{DAI}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Fig. 8

| Cross-subframe scheduling flag | Cross-subframe scheduling flag mask $< x_0, x_1, \cdots, x_{15} >$ |
|---|---|
| Self-subframe scheduling | <0, 0, 0, 0, 0, 0, 0, 0, 0, 0, 0, 0, 0, 0, 0, 0> |
| Cross-subframe scheduling | <0, 0, 0, 1, 0, 0, 0, 1, 0, 0, 0, 1, 0, 0, 0, 1> |

DL SCHEDULING AND HARQ-ACK FEEDBACK FOR DL TRANSMISSIONS IN FLEXIBLE-TDD SYSTEMS WITHOUT AND WITH CROSS-SUBFRAME SCHEDULING

TECHNICAL FIELD

The present application is a national stage application of International Application No. PCT/JP2014/065020 entitled "DL Scheduling and HARQ-ACK for DL Transmissions in Flexible-TDD Systems Without and With Cross-Subframe Scheduling," filed on May 29, 2014, which claims the benefit of priority from Australian Patent Application 2013-902001, filed on Jun. 4, 2013, the disclosures of which are incorporated herein in their entirety by reference thereto. The present invention relates to control signalling in advanced wireless communications networks and systems. In particular, although not necessarily exclusively, the present invention relates to issues concerning downlink (DL) scheduling and hybrid automatic repeat request acknowledgment (HARQ-ACK) feedback for DL transmissions in flexible time division duplex (flexible-TDD) systems.

BACKGROUND ART

The following abbreviations may be found herein:

| | |
|---|---|
| 3GPP | third generation partnership project |
| ACK | acknowledgement |
| CRC | cyclic redundancy check |
| DAI | downlink assignment index |
| DCI | downlink control information |
| DL | downlink |
| eIMTA systems | systems with TDD interference management and traffic adaptation |
| eNB | node B/eNodeB/base station |
| FDD | frequency division duplex |
| HARQ | hybrid automatic repeat request |
| HARQ-ACK | hybrid automatic repeat request acknowledgment |
| LTE | long term evolution |
| LTE-A | long term evolution advanced |
| NACK | negative acknowledgement |
| (E)PDCCH | (enhanced) physical downlink control channel |
| PDSCH | physical downlink shared channel |
| PUCCH | physical uplink control channel |
| PUSCH | physical uplink shared channel |
| Rel. | Release (e.g. LTE Rel. 11 means LTE Release 11) |
| SIB | system information block (e.g. SIB-1 or SIB1 means system information block type 1) |
| SIF | subframe indicator field |
| SPS | semi-persistent scheduling |
| TDD | time division duplex |
| TPC | transmit power control |
| UCI | uplink control information |
| UE | user equipment |
| UL | uplink |

LTE wireless communication systems aim to provide enhanced services including higher data rates and lower latency with reduced cost. One benefit of deploying LTE TDD systems is to enable configurable asymmetric UL-DL resource allocations in a radio frame. Typically if more data is to be sent in DL, there can be a higher number of DL subframes configured in a radio frame to accommodate the greater DL data volume. In previously-proposed LTE TDD systems, asymmetric resource allocation is achieved by providing seven different semi-statically configured UL-DL subframe configurations for a given radio frame, as specified in Table 4.2-2 of 3GPP TS 36.211 v 10.5.0 (2012-06) which is extracted below.

TABLE 4.2-2

Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It can be seen that the different TDD UL-DL configurations in the table above provide between 40% and 90% DL subframes, and in conventional practice the UL-DL configuration in use at an eNB is informed to the UE (and changed) only via system information on the broadcast channel. The UL-DL configuration is only configured semi-statically and so may not adapt/match to the instantaneous traffic situation. This is inefficient in terms of resource utilization, particularly in small cells or cells with a small number of users where the traffic situation can often change more frequently or rapidly.

To address this inefficiency, a flexible TDD configuration study item for LTE-A Release 11 was completed. Evaluations in the study item revealed possibly significant performance benefits by allowing TDD UL-DL reconfiguration based on traffic adaptation in small cells. The studies also recommended interference mitigation schemes for systems with TDD UL-DL reconfiguration.

For asymmetric UL-DL configuration and flexible TDD allocation, there are several challenges to overcome before any implementation may be considered viable. One challenge relates to reference HARQ-timing used for UL and DL when TDD reconfiguration may happen as frequently as on a radio frame basis. It is thought that addressing certain difficulties associated with HARQ-ACK feedback for DL transmission (particularly difficulties related to the timing coupling between UL grant and DL scheduling in flexible-TDD systems) may help in this regard.

Diagram (100) in FIG. 1 illustrates the HARQ timing rule specified in LTE Rel. 8, 9, 10 and 11. As specified in LTE Rel. 8-11 and illustrated in diagram (100), one UL subframe in radio frame (n) or (n+1) is responsible for carrying HARQ-ACK feedback for M DL and/or special subframes in radio frame (n), where M is the size of a DL association set K as specified in Table 10.1.3.1-1 of 3GPP TS 36.213 (which is the lower table (120) in FIG. 1). In table (120), the DL association set K is defined for each UL subframe for the different TDD UL-DL configurations. For instance, in TDD UL-DL configuration #3 (125), UL subframe #2 (124) is responsible for carrying HARQ-ACK feedback for DL transmissions which happened k subframes earlier, where the value(s) of k is/are specified in table (120). In this instance (i.e. for UL subframe #2 in TDD UL-DL configuration #3) the values of k are 7 (123), 6 (122) and 11 (121). Hence, UL subframe #2 (124) in TDD UL-DL configuration #3 (125) is responsible for carrying HARQ-ACK feedback for the $7^{th}$, $6^{th}$ and $11^{th}$ earlier subframes. As a result, in TDD UL-DL configuration #3 (125), UL subframe #2 (114) in radio frame n+1 is responsible for carrying HARQ-ACK feedback for the following subframes in frame n: special subframe #1 (111) (for k=11), DL subframe #5 (112) (for k=7) and DL subframe #6 (113) (for k=6). Thus, in this example, the predefined DL association set K is {7, 6, 11} or {DL subframe #5, DL subframe #6, special subframe #1} and M=3.

In the present context, the subframe number of a particular subframe in a radio frame may also be referred to as the subframe index. For example, for UL subframe #2 in a given radio frame, the subframe index is 2. Likewise, for UL subframe #5 in a given radio frame, the subframe index is 5.

In cases where only one serving cell is configured for a UE, a 2-bit Downlink Assignment Index (DAI) field, $V_{DAI}^{UL}$, in DCI format 0/4 represents the total number of subframes with PDSCH transmissions and with PDCCH/EPDCCH indicating downlink SPS release sent to the corresponding UE within all the subframes of the DL association set. The value of $V_{DAI}^{UL}$ includes all PDSCH transmissions, with and without corresponding PDCCH/EPDCCH, within all subframes in the DL association set K.

In timing diagram (200) in FIG. 2A, TDD UL-DL configuration #1 is broadcast by a base station using SIB-1. According to the LTE Rel. 8-11 HARQ timing rule discussed above, the HARQ-ACK feedback for DL subframe #0 (201) and/or for special subframe #1 (202) is reported on UL subframe #7 (203). Hence, the relevant DL association set K related to UL subframe #7 (203) is {7,6} or {DL subframe #0 (201), special subframe #1 (202)}. The total number of subframes with PDSCH transmissions and with PDCCH/EPDCCH indicating downlink SPS release within this DL association set {DL subframe #0, special subframe #1} related to UL subframe #7 (203) is indicated by the value of $V_{DAI}^{UL}$ in UL grant (204). UL grant (204) is sent by the base station on special subframe #1 for PUSCH transmission on UL subframe #7 according to the UL grant timing specified in table 8-2 of TS36.213 (see immediately below). Notably, the UL grant (204) is sent on special subframe #1 (202) which is the latest subframe in the DL association set related to UL subframe #7 (203).

| TDD UL/DL Configu- | DL subframe number n | | | | | | | | | |
|---|---|---|---|---|---|---|---|---|---|---|
| ration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

As another example, according to the HARQ timing rule discussed above, in TDD UL-DL configuration #1 the HARQ-ACK for DL subframe #5 and/or for special subframe #6 in frame n is reported on UL subframe #2 in frame n+1. The total number of subframes with PDSCH transmissions and with PDCCH/EPDCCH indicating downlink SPS release within the DL association set {DL subframe #5 in frame n, special subframe #6 in frame n}(or {7,6}) related to UL subframe #2 in frame n+1 is indicated by $V_{DAI}^{UL}$ sent in the UL grant (206). UL grant (206) is sent by the base station on special subframe #6 in frame n for PUSCH transmission on UL subframe #2 in frame n+1 (this is again according to UL grant timing specified in table 8-2 above). And again, the UL grant (206) is sent on special subframe #6 in frame n which is the latest subframe in the DL association set related to UL subframe #2 in frame n+1.

Thus, it can be observed that all UL grants (204, 205, 206 and 207 in FIG. 2A) are transmitted in the DL/special subframe which is the latest DL transmission instance in the related DL association set. Therefore, the UL grant timing allows the base station to count all of the PDSCH transmissions and PDCCH/EPDCCH transmissions indicating SPS release which happened within a DL association set and to notify the intended UE of the number of said transmissions using $V_{DAI}^{UL}$ in the UL grant. In other words, because UL grants are sent on the last subframe in the related DL association set, the base station such as eNB can count the number of subframes in that DL association set (up to and including the said last subframe on which the UL grant is sent) which included PDSCH transmissions and/or PDCCH/EPDCCH transmissions indicating SPS release, and it can communicate this number to the intended UE via $V_{DAI}^{UL}$ sent in the UL grant. Then, by interpreting $V_{DAI}^{UL}$ in the received UL grant, the UE can tell the total number of PDSCH transmissions and PDCCH/EPDCCH transmissions indicating SPS release that it should have received. This then enables the UE to know whether to send ACK or NACK in the relevant UL subframe, depending on whether or not all PDSCH transmissions and PDCCH/EPDCCH transmissions indicating SPS release are successfully received.

The UL grant timing diagram (200A) in FIG. 2B shows the timing of UL granting and DL HARQ-ACK timing for all seven TDD UL-DL configurations. It can be seen that an UL grant is always transmitted no earlier than the last DL transmission instance within the DL association set related to the particular UL subframe. There is therefore a coupling between the timing of UL grant and DL transmission scheduling. As a result, it could be problematic if the timing of UL grant and DL transmission scheduling were to follow different reference timing for a particular TDD UL-DL configuration.

In spite of this, in flexible-TDD systems, reference timing configurations are expected to be selected independently for DL and UL respectively. In other words, in flexible-TDD systems, the timing of UL grant and DL transmission scheduling are expected to follow different reference timing for a particular TDD UL-DL configuration. The abovementioned coupling between the timing of UL grant and DL transmission scheduling may therefore have the potential to cause problems, including in relation to TDD HARQ-ACK bundling and TDD HARQ-ACK multiplexing operation, and it may be desirable if such problems (or one or some of them) could be ameliorated or at least reduced. Ameliorating or reducing such problems (or one or some of them) may help to achieve gains from flexible-TDD systems.

It is to be clearly understood that mere reference herein to previous or existing apparatus, systems, methods, practices, publications or other information, or to any associated problems or issues, does not constitute an acknowledgement or admission that any of those things individually or in any combination formed part of the common general knowledge of those skilled in the field, or that they are admissible prior art.

SUMMARY OF INVENTION

In a first form, the present invention relates broadly to a signaling method for use in a wireless communication system that supports flexible allocation of TDD UL-DL configurations and in which HARQ-ACK bundling is used, the method comprising:

allocating one of a plurality of TDD UL-DL configurations for use on a given radio frame, wherein for a given TDD UL-DL configuration:

an UL subframe carries HARQ-ACK feedback for one or more DL and/or special subframes in the given radio frame and/or a previous radio frame, a DL association set comprises the one or more DL and/or special subframes for which HARQ-ACK feedback is carried in the said UL subframe; and an UL grant for the said UL subframe is sent on one of the DL and/or special subframes in the DL association set; and the method also comprising scheduling (enhanced) physical downlink control channel (PD-CCH/EPDCCH) transmissions indicating DL semi-persistent scheduling (SPS) release and/or physical downlink shared channel (PDSCH) transmissions with corresponding PDCCH/EPDCCH only on DL and/or special subframes in the DL association set which are not after the subframe carrying the UL grant.

The method in the first form of the invention above may further include scheduling SPS PDSCH transmission(s) on subframe(s) in the DL association set which are not after the UL grant subframe and/or on subframe(s) in the DL association set which are after the UL grant subframe.

A TDD UL-DL configuration may be used as reference timing for UL-HARQ and UL grant timing. The TDD UL-DL configuration used as reference timing for UL-HARQ and UL grant timing may have UL subframes which are a super set of the UL subframes in the instantaneous TDD UL-DL configuration in use on the current radio frame. Similarly, a TDD UL-DL configuration may be used as reference timing for DL-HARQ timing, and the TDD UL-DL configuration used as reference timing for DL-HARQ timing may have DL subframes which are a super set of the DL subframes in the instantaneous TDD UL-DL configuration in use on the current radio frame. This may apply to all forms and embodiments of the invention.

In embodiments of the method according to the first broad form of the invention, the wireless communication system may comprise an advanced base station (eNB), one or more advanced user equipments (UEs) and one or more legacy UEs, and the method may further comprise allocating a TDD UL-DL configuration for advanced UE(s) which are operable according to a flexible TDD allocation, and allocating a TDD UL-DL configuration for legacy UE(s) which operate according to a long-term TDD allocation, wherein the TDD UL-DL configuration allocated for legacy UE(s) is the same or different to the TDD UL-DL configuration allocated for advanced UE(s).

Suitably, the step of scheduling PDCCH/EPDCCH transmissions indicating DL SPS release and/or PDSCH transmissions with corresponding PDCCH/EPDCCH only on DL and/or special subframes in the DL association set which are not after the subframe carrying the UL grant may be performed by the advanced base station for advanced UEs.

The method in the first broad form of the invention may further comprise cross-subframe scheduling wherein, for a PDSCH transmission on a particular subframe, the corresponding PDCCH/EPDCCH associated with that PDSCH transmission is sent in a different subframe.

In a second form, the present invention relates broadly to a signaling method for use in a wireless communication system that supports flexible allocation, by a base station (which may be an advanced base station), of TDD UL-DL configurations for use in signaling between the base station (eNB) and an advanced UE, and wherein HARQ-ACK multiplexing is used, the method comprising:

allocating one of a plurality of TDD UL-DL configurations for use on a given radio frame, wherein for a given TDD UL-DL configuration:

an UL subframe carries HARQ-ACK feedback for a plurality of DL and/or special subframes in the given radio frame and/or a previous radio frame, a DL association set comprises the plurality of DL and/or special subframes for which HARQ-ACK feedback is carried in the said UL subframe; and an UL grant for the said UL subframe is sent on one of the DL and/or special subframes in the DL association set; and the method also comprises:

setting the value of a DL assignment index ($V_{DAI}^{UL}$) to the number of subframes in the DL association set; and transmitting $V_{DAI}^{UL}$ from the base station (eNB) to the advanced UE in the UL grant, where $V_{DAI}^{UL}$ indicates the total number of expected subframes with PDCCH/EPDCCH(s) associated with PDSCH transmission(s) and PDCCH/EPDCCH transmission(s) indicating DL SPS release in the DL association set.

In the method according to the second broad form of the invention:

the UE may determine the number of HARQ-ACK feedback bits $O^{ACK}$ and the HARQ-ACK feedback bits $o_n^{ACK}$, n=0, . . . , $O^{ACK}$−1 to be transmitted in the UL subframe, for any SPS PDSCH transmission without a corresponding PDCCH/EPDCCH which is received by the UE, the associated HARQ-ACK feedback bit may be mapped to $o_{o^{ACK}-1}^{ACK}$, and HARQ-ACK feedback bits for any DL and/or special subframes on which the UE did not detect a PDSCH transmission or a PDCCH/EPDCCH indicating DL SPS release may be set to NACK.

In embodiments of the method according to the second broad form of the invention, there may be one or more advanced UEs, the wireless communication system may further includes one or more legacy UEs, and the method may further comprise allocating a TDD UL-DL configuration for advanced UE(s) which are operable according to a flexible TDD allocation, and allocating a TDD UL-DL configuration for legacy UE(s) which operate according to a long-term TDD allocation, wherein the TDD UL-DL configuration allocated for legacy UE(s) is the same or different to the TDD UL-DL configuration allocated for advanced UE(s).

Just like in the first form of the invention, embodiments of the method in the second broad form of the invention may comprise cross-subframe scheduling wherein, for a PDSCH transmission on a particular subframe, the corresponding PDCCH/EPDCCH associated with that PDSCH transmission is sent in a different subframe.

In a third form, the invention relates broadly to a signaling method for use in a wireless communication system that supports flexible allocation of TDD UL-DL configurations. TDD HARQ-ACK bundling or TDD HARQ-ACK multiplexing may optionally be used in the wireless communication system. In any case, the method in the third form of the invention comprises cross-subframe scheduling wherein, for a PDSCH transmission on a particular subframe, the corresponding PDCCH/EPDCCH associated with that PDSCH transmission is sent in a different subframe.

In embodiments of the third form of the invention, the method may further include:
  allocating one of a plurality of TDD UL-DL configurations for use on a given radio frame, wherein for a given TDD UL-DL configuration:
    an UL subframe carries HARQ-ACK feedback for one or more DL and/or special subframes in the given radio frame and/or a previous radio frame,
    a DL association set comprises the one or more DL and/or special subframes for which HARQ-ACK feedback is carried in the said UL subframe; and
    an UL grant for the said UL subframe is sent on one of the DL and/or special subframes in the DL association set.

In these embodiments of the third form of the invention, for a PDSCH transmission on a subframe in the DL association set which is after the UL grant subframe, the corresponding PDCCH/EPDCCH associated with that PDSCH transmission may be cross-subframe scheduled and sent on a subframe in the DL association set which is not after the UL grant subframe. Embodiments of the method according to the third broad form of the invention may also include transmitting a DL assignment index ($V_{DAI}^{UL}$) (from an advanced base station) in the UL grant, wherein $V_{DAI}^{UL}$ indicates the total number of the following sent to an advanced UE within the DL association set:
  (i) PDSCH transmission(s);
  (ii) cross-subframe scheduled PDCCH/EPDCCH(s) on subframe(s) not after the UL grant subframe which correspond to PDSCH(s) on subframe(s) after the UL grant subframe; and
  (iii) PDCCH/EPDCCH transmission(s) indicating DL SPS release.

In embodiments of the method according to the third broad form of the invention, a given DL or special subframe in the DL association set may contain one or both of:
  a self-subframe scheduled PDCCH/EPDCCH being a PDCCH/EPDCCH associated with a PDSCH transmission where the PDSCH is included on the same subframe, in which case there is a zero subframe offset between the PDSCH transmission and the associated PDCCH/EPDCCH, and
  a cross-subframe scheduled PDCCH/EPDCCH being a PDCCH/EPDCCH associated with a PDSCH transmission where the PDSCH is on a different subframe, in which case there is a non-zero subframe offset between the PDSCH transmission and the associated PDCCH/EPDCCH.

In embodiments of the third form of the invention, a new downlink control information (DCI) may be provided which includes a 2-bit subframe indicator field (SIF) for indicating the subframe offset. In LTE-TDD systems, the 2-bit SIF may be used to indicate the number of subframes of the subframe offset. In LTE-FDD systems, the 2-bit SIF may be used to indicate the subframe offset between a PDSCH transmission and the associated cross-subframe scheduled PDCCH/EPDCCH as one or both of (i) a time offset or (ii) an offset expressed in terms of subframe index or difference in subframe index.

Alternatively, existing DCI may be used, and whether the said DCI is used for self-subframe scheduling or cross-subframe scheduling may be determined using a mask on the cyclic redundancy check (CRC) of the received DCI. In this case, after PDCCH/EPDCCH decoding, one of two masks is used for CRC checking, and if the CRC checking passes, whether the DCI has been used for cross-subframe scheduling or for self-subframe scheduling can be ascertained based on which one of the masks is determined to have been used. The entire PDCCH/EPDCCH payload may be used to calculate CRC parity bits, the bits of the PDCCH/EPDCCH payload being $a_0, a_1, \ldots, a_{A-1}$ where A is the PDCCH/EPDCCH payload size, the parity bits being $p_0, p_1, \ldots, p_{L-1}$ where L is the number of parity bits, the CRC parity bits in DCI may be scrambled with either a self-subframe scheduling or cross-subframe scheduling mask $x_0, x_1, \ldots, x_{15}$ as shown in the table

| Cross-subframe scheduling flag | mask $\langle x_0, x_1, \ldots, x_{15}\rangle$ |
|---|---|
| Self-subframe scheduling | <0, 0, 0, 0, 0, 0, 0, 0, 0, 0, 0, 0, 0, 0, 0, 0> |
| Cross-subframe scheduling | <0, 0, 0, 1, 0, 0, 0, 1, 0, 0, 0, 1, 0, 0, 0, 1> | and corresponding radio network temporary identities (RNTI) $x_{rnti,0}, x_{rnti,1}, \ldots, x_{rnti,15}$ may be used to form a sequence of bits $c_0, c_1, \ldots, c_{A+L}$, where $$c_k = a_k \text{ for } k=0,1,2,\ldots,A-1$$

$$c_k = (a_k + x_{rnti,k-A} + x_{k-A}) \bmod 2 \text{ for } k=A, A+1, A+2, \ldots, A+15$$

As a further alternative, an existing DCI may be used which includes a 2-bit transmit power control (TPC) field originally intended for adjusting transmission power of PUCCH, and the said 2-bit TPC field may instead be used to indicate subframe offset or the location of the subframe for a PDSCH corresponding to a cross-subframe scheduled PDCCH/EPDCCH. As yet a further alternative, an existing DCI may be used which includes a 2-bit DL assignment index (DAI). More than one DL DCI may be transmitted within the same DL/special subframe, and the DL DAI value in the DCI for self-subframe scheduling may be counted before the DL DAI in the DCI for cross-subframe scheduling.

In a further broad form, the invention relates to a wireless communication system which operates according to any of the methods (or embodiments thereof) described above. And in yet a further broad form, the invention relates to a base station operable to perform the method (or any embodiments thereof) described above.

Any of the features, characteristics or functions described herein can be combined in any combination with any one or more of the other features, characteristics or functions described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 7 is Value of Downlink Assignment Index.

FIG. 8 is cross-subframe scheduling flag mask.

DESCRIPTION OF EMBODIMENTS

In the following discussion, DL/special subframe(s) in a DL association set K which are transmitted by a base station after the subframe carrying the related UL grant will be referred to as "late subframe(s)", and DL/special subframe(s) in a DL association set K which are transmitted by a base station no later than the subframe carrying the related UL grant will be referred to as "early subframe(s)".

Figure 4:
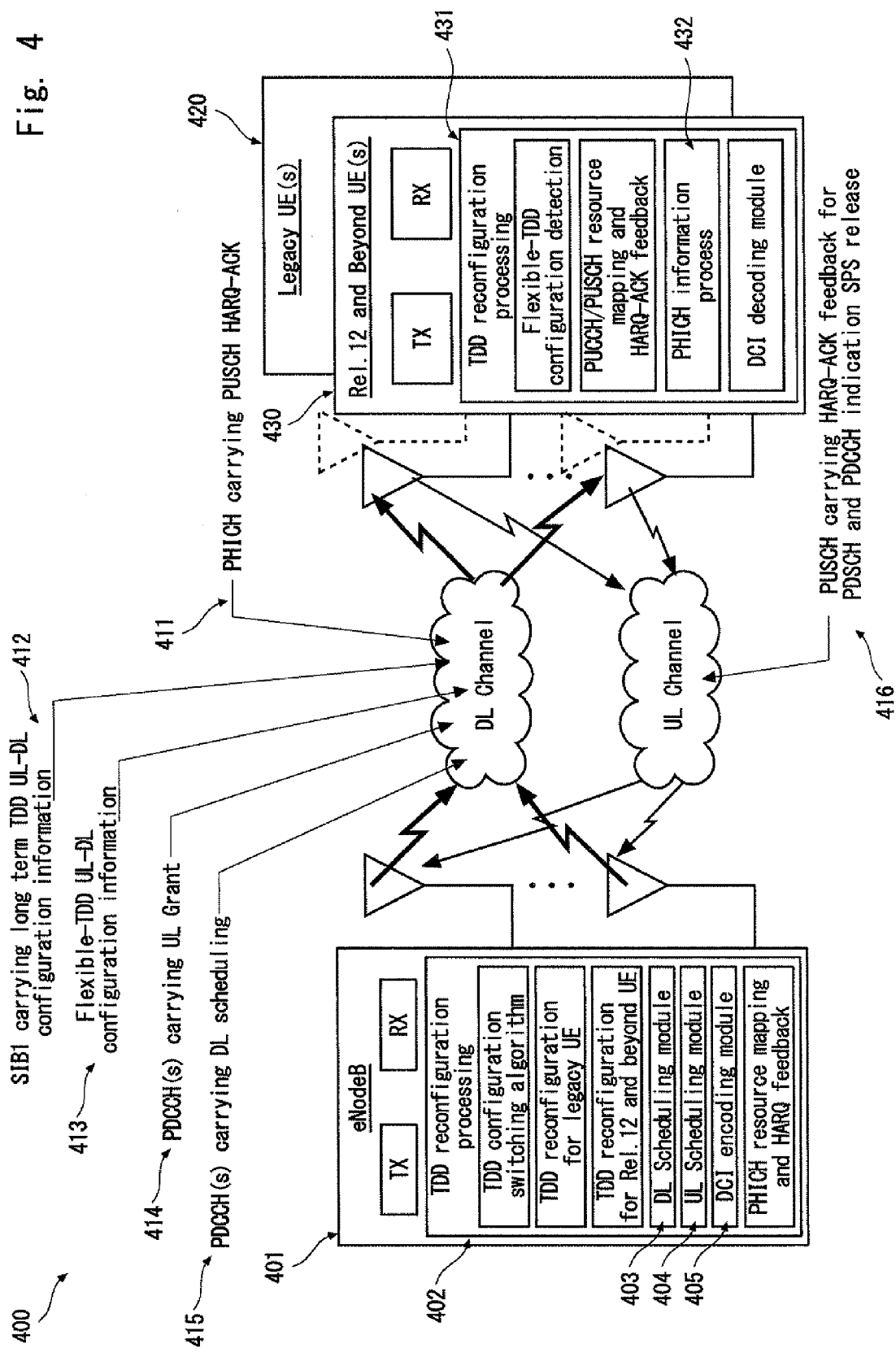
FIG. 4 is a schematic illustration of an advanced wireless communication system that supports flexible allocation of TDD UL-DL configurations. The illustrated wireless communication system is an example of a system in which embodiments of the present invention could be implemented.

The present invention may be implemented in an advanced wireless communication system that supports Flexible-TDD UL-DL configuration, an example of which is represented schematically in FIG. 4. The advanced wireless communication system (400) depicted in FIG. 4 includes an advanced base station which may be, for example, a Rel. 12 & beyond eNB (401) which is backward compatible with previous releases such as Rel. 8, 9, 10 and 11. The base station/eNB (401) provides wireless connectivity, network access and coverage for legacy UE(s) (420) as well as for advanced UE(s). The advanced UE(s) may be, for example, Rel. 12 & beyond UE(s) (430). The base station/eNB (401) has a "TDD reconfiguration processing" function (402) which takes the UL-DL traffic ratio observed in unrestricted timeframe into consideration when it performs a TDD configuration switching algorithm for the selection of appropriate long term and short term TDD UL-DL configuration for legacy UE(s) (420) and Rel. 12 & beyond UE(s) (430). The base station/eNB (401) also includes: a DL scheduling module (403) for handling dynamically scheduled DL transmission (self-subframe scheduling and/or cross-subframe scheduling) and/or DL SPS; an UL scheduling module (404) for handling UL grant for the transmission of UL PUSCH(s); and a DCI encoding module (405) for ensuring the correct setting of 'Downlink Assignment Index' (DAI) and 'Transmit Power Control' (TPC).

The eNB (401) broadcasts a long term TDD UL-DL configuration to legacy UE(s) (420), and also to advanced UE(s) (e.g. Rel. 12 & beyond UE(s) (430)), using SIB-1 (System Information Block type 1) (412). The TDD UL-DL configuration transmitted on SIB-1 is considered "long term" as the period for SIB-1 update is in the order of 640 ms. The eNB (401) may also use a fast signaling approach to communicate short term TDD UL-DL configuration (413) to only advanced UE(s) (e.g. Rel. 12 & beyond UE(s) (430)).

The period for "short term" TDD UL-DL configuration update may be as short (i.e. as frequent) as 10 ms (i.e. radio frame basis). The eNB (401) will also transmit PDCCH/EPDCCH(s) carrying UL grant (414) to intended UE(s) using long term TDD UL-DL configuration timing if the intended UE(s) are legacy UE(s), and using predetermined reference TDD UL-DL configuration timing if the intended UE(s) are advanced UE(s) supporting dynamic reconfiguration of TDD UL-DL configuration on a radio frame basis. The eNB (401) may further send the Downlink Assignment Index (DAI) $V_{DAI}^{UL}$ in the UL grant (414), although the value of $V_{DAI}^{UL}$ sent may depend on the TDD HARQ-ACK mode setting (bundling or multiplexing) being used. See below. As explained above, the DAI ($V_{DAI}^{UL}$) is used for correctly generating HARQ-ACK feedback corresponding to the reception (or non-reception) at the UE(s) side of PDCCH/EPDCCH(s) associated with PDSCH and PDCCH/EPDCCH indicating downlink SPS release. The UL grant (414) may further comprise a TPC field that may be utilised by the base station and understood by the advanced UE(s) for indicating the location of subframe(s) on which the related PDSCH will be transmitted. The eNB (401) may further transmit PDCCH/EPDCCH(s) carrying DL dynamic scheduling information (415) to intended UE(s). The intended UE(s) may be legacy UE(s) (420), or advanced UE(s) (430) supporting dynamic reconfiguration of TDD UL-DL configuration on radio frame basis with or without cross-subframe scheduling. For an advanced UE(s) (430) with cross-subframe scheduling capability, the eNB (401) may further use a proposed "subframe indicator field" or TPC field with or without cross-subframe scheduling masking in the transmitted DL DCI to indicate the cross-subframe scheduling and the location of subframe(s) on which the related PDSCH will be transmitted.

In addition to performing reception and use of the TDD UL-DL configuration broadcast on SIB-1, advanced UE(s) such as Rel. 12 & beyond UE(s) (430) that operate within coverage of the advanced base station (which may be a Rel. 12 & beyond eNB (401)) will further perform TDD reconfiguration processing (431) which includes detecting short term UL-DL configuration information. The processing (431) will also include PDSCH HARQ encoding and selection of the appropriate UL subframe(s) for sending PDSCH HARQ feedback to the eNB (401). The processing (431) will also include determination of the DL subframe on which the UE will monitor for its UL grant for the transmission of corresponding UL-SCH. The processing (431) further includes "DCI decoding" (which may be performed by a DCI decoding module (432)) which, depending on the TDD HARQ-ACK mode (bundling or multiplexing) being used, correctly interprets the received Downlink Assignment Index ($V_{DAI}^{UL}$) in the detected UL grant for correct HARQ feedback. For advanced UE(s) (430) supporting cross-subframe scheduling understood by base station (401), the "DCI decoding" (432) may further be responsible for interpreting the proposed "subframe indicator field (SIF)" or TPC field with or without cross-subframe scheduling masking in determining the subframe location for the reception of the cross-subframe scheduled PDSCH(s).

Legacy UE(s) (420) operating within the coverage of the advanced base station (e.g. Rel. 12 & beyond eNB (401)) will use the TDD UL-DL configuration broadcast on SIB-1 and operate according to the legacy specifications to which it/they comply. The eNB (401) may not schedule legacy UE(s) (420) to perform reception of PDSCH(s) or transmission of PUSCH(s) on the flexible subframes.

TDD HARQ-ACK Bundling without Cross-Subframe Scheduling

According to previous proposals for LTE with TDD HARQ-ACK bundling operation (see 3GPP TS 36 213 V8.8.0 (2009-10), §7.3, page 50), "for the case that UE is transmitting on PUSCH and the PUSCH transmission is adjusted based on a detected PDCCH/EPDCCH with DCI format 0/4 intended for the UE and TDD UL-DL configuration 1-6, if $V_{DAI}^{UL} \neq (U_{DAI}+N_{SPS}-1) \bmod 4+1$ the UE detects that at least one downlink assignment has been missed and the UE shall generate NACK for all codewords". $U_{DAI}$ denotes the total number of PDCCH/EPDCCH(s) associated with PDSCH transmission(s) and PDCCH/EPDCCH indicating downlink SPS release detected by a UE within the DL association set, and $N_{SPS}$ denotes the number of PDSCH transmission(s) without a corresponding PDCCH/EPDCCH in the DL association set.

Figure 3:
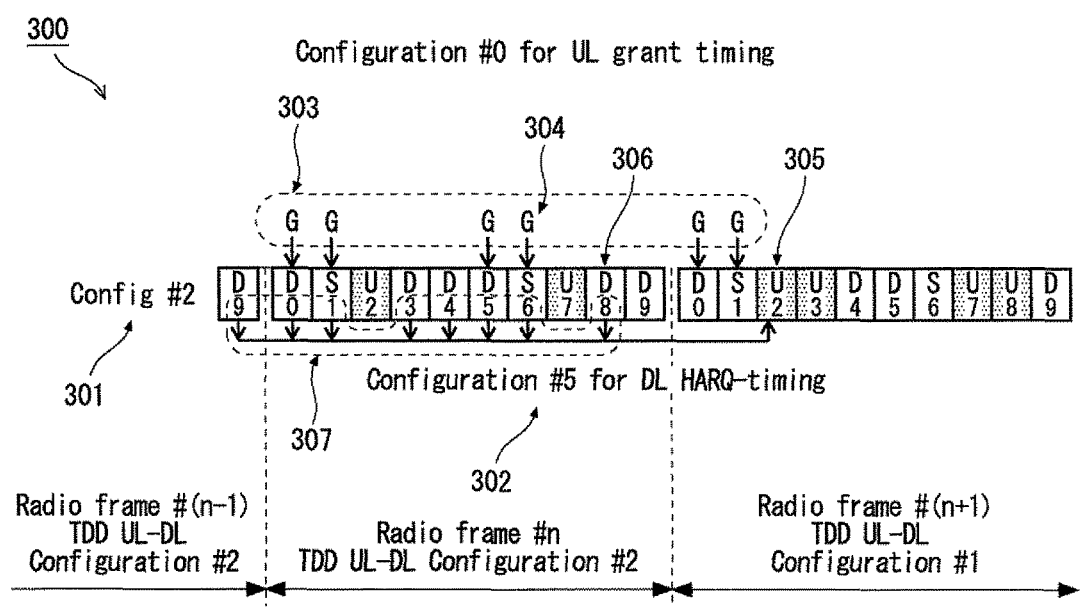
FIG. 3 is a timing diagram which schematically illustrates DL HARQ-ACK timing and UL grant timing in an example situation where the reference TDD UL-DL configuration used for UL grant timing, and the reference TDD UL-DL configuration used for DL HARQ-timing, are both different to the instantaneously configured TDD UL-DL configuration.

In the flexible TDD timing diagram (300) in FIG. 3, TDD UL-DL configuration #2 is configured as the instantaneous UL-DL configuration for radio frame (n−1) and also for radio frame (n). For radio frame (n+1), TDD UL-DL configuration #1 is configured as the instantaneous UL-DL configuration.

According to a working assumption for flexible TDD systems, a TDD UL-DL configuration that has UL subframes which are a super set of the instantaneously configured UL-DL configuration will be used as reference timing for UL-HARQ and UL Grant timing, and a TDD UL-DL configuration that has DL subframes which are a super set of the instantaneously configured UL-DL configuration will be used as reference timing for DL-HARQ timing.

Figure 1:
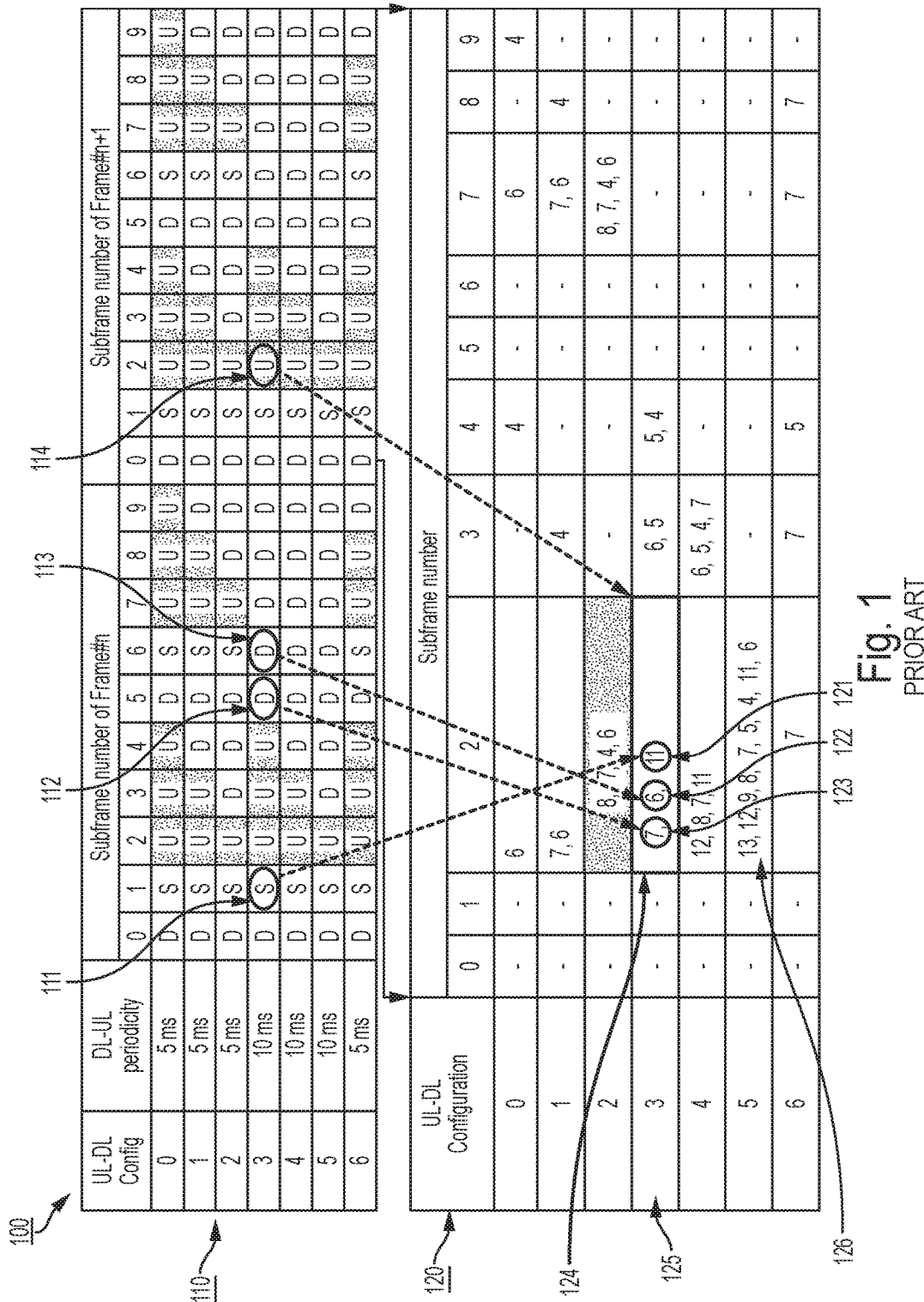
FIG. 1 provides a schematic illustration, by way of example, of the HARQ timing rule specified in LTE Rel. 8, 9, 10 and 11.

By way of example, from FIG. 1 (and also Table 4.2-2 above) it can be seen that TDD UL-DL configuration #0 has all the same UL subframes as TDD UL-DL configurations #1 and #2 plus additional UL subframes besides. Thus TDD UL-DL configuration #0 has UL subframes which are a super set of the UL subframes in TDD UL-DL configurations #1 and #2 (TDD UL-DL configurations #1 and #2 are the instantaneously configured UL-DL configurations in FIG. 3). Also, TDD UL-DL configuration #5 has all the same DL subframes as TDD UL-DL configurations #1 and #2 plus additional DL subframes besides. So TDD UL-DL configuration #5 has DL subframes which are a super set of the DL subframes in TDD UL-DL configurations #1 and #2.

Therefore, referring to FIG. 3, TDD UL-DL configuration #0 can be used as reference timing for UL-HARQ and UL Grant timing because TDD UL-DL configuration #0 has UL subframes which are a super set of those in the respective instantaneously configured TDD UL-DL configurations. Similarly, TDD UL-DL configuration #5 can be used as reference timing for DL-HARQ timing because TDD UL-DL configuration #5 has DL subframes which are a super set of those in the respective instantaneously configured TDD UL-DL configurations.

Figure 2A:
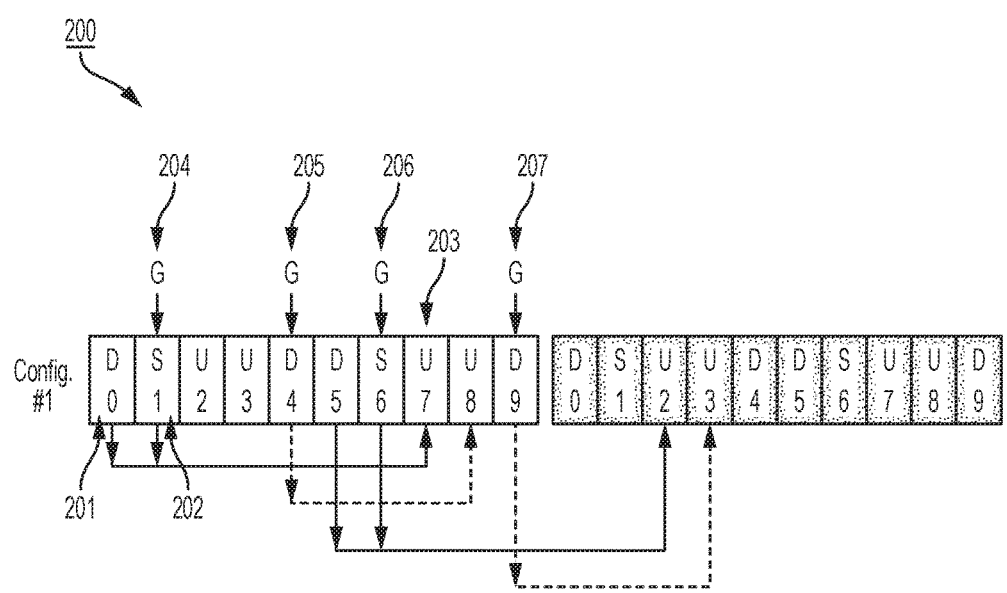
FIG. 2A is a timing diagram which schematically illustrates the DL HARQ-ACK timing and UL grant timing for TDD UL-DL configuration #1.
Figure 2B:
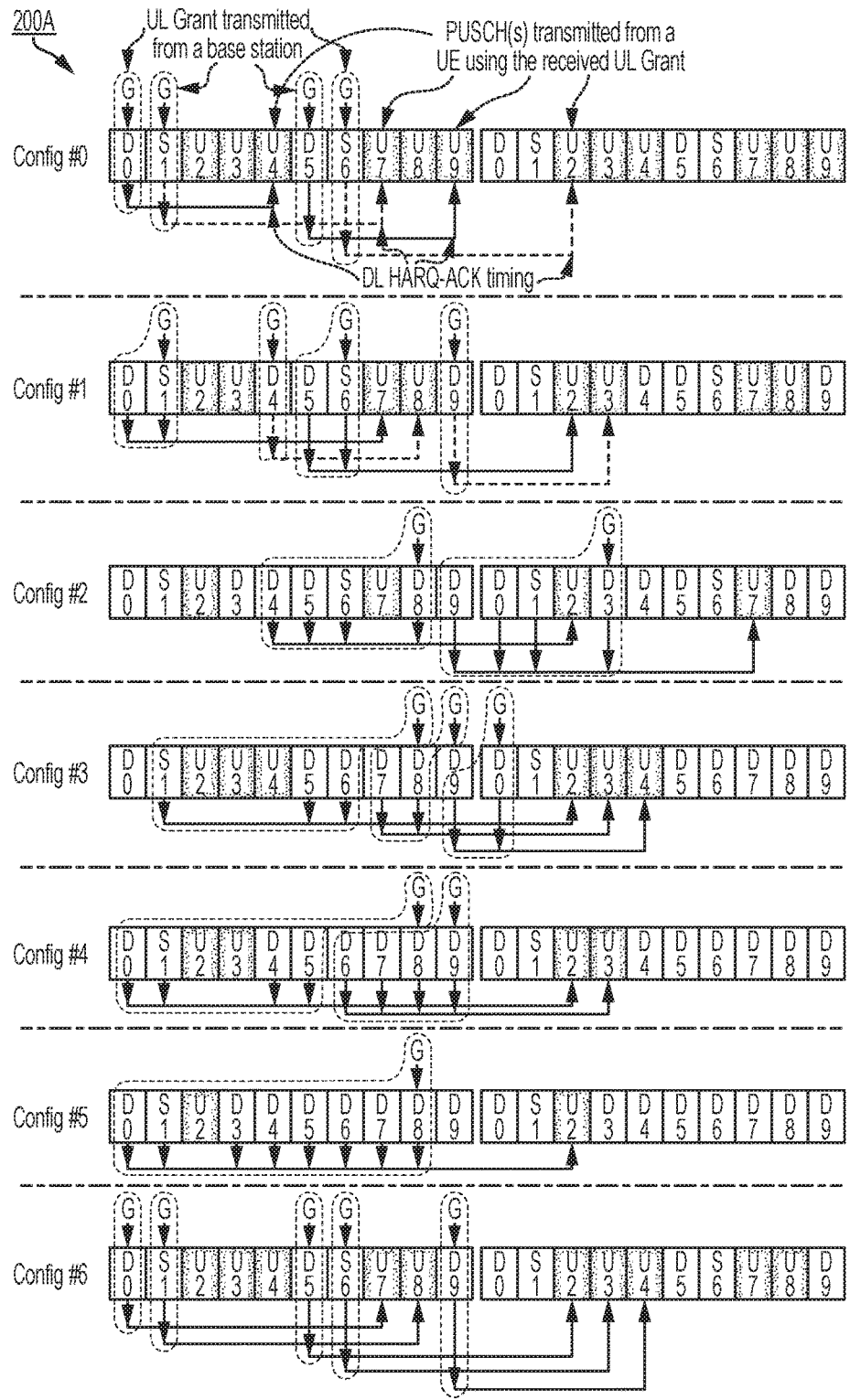
FIG. 2B contains timing diagrams which schematically illustrate the DL HARQ-ACK timing and UL grant timing for all seven TDD UL-DL configurations.

Referring still to FIG. 3, by following the DL HARQ-timing of TDD configuration #5 (recall the explanations given with reference to FIG. 1 above), the HARQ-ACK feedback for up to 8 DL subframes (namely subframes 8, 6, 5, 4, 3, 1 and 0 of radio frame n and subframe 9 of radio frame (n−1)) is fed back to the base station on UL subframe #2 (305) in frame (n+1). With configuration #0 (303) used as reference timing for UL Grant (recall the explanations given with reference to FIGS. 2A and 2B above), if there is a PUSCH transmission on UL subframe #2 (305) in frame (n+1), the UL grant for that PUSCH transmission would be transmitted on special subframe #6 (304) in frame (n).

Furthermore, as discussed above, the UE should use the $V_{DAI}^{UL}$ value provided in said UL grant in generating HARQ-ACK feedback.

In relation to the example in the previous paragraph, it should be noted that because the reference configuration used for UL grant timing is different from the reference configuration used for DL HARQ-timing, the UL grant (304) is sent on special subframe #6 in radio frame n BUT this is not the last DL/special subframe in the DL association set K (307) related to UL subframe #2 (305). As a result, at subframe #6 (304), the base station will not know whether there will be a dynamically scheduled PDSCH/PDCCH/EPDCCH transmission in DL subframe #8 (306) since the DL scheduling decision for DL subframe #8 (306) is made after subframe #6 (304). Thus, it is impossible for the PDSCH transmission in DL subframe #8 (306) to be included in the determination of the $V_{DAI}^{UL}$ value provided in the UL grant (which is sent by the base station on DL special subframe #6 (304)), and this may cause problems in relation to the HARQ feedback sent by the UE on UL subframe #2 in radio frame (n+1).

Continuing to refer to FIG. 3, assuming there is a PDSCH/PDCCH/EPDCCH transmission in each DL/special subframe in the DL association set (307) (i.e. assuming there is a PDSCH/PDCCH/EPDCCH transmission in all eight subframes of DL association set (307)), and assuming the value of $V_{DAI}^{UL}$ sent in the UL grant on special subframe #6 (304) accounts for the DL transmissions in all of the DL/special subframes in the DL association set except for the one on DL subframe #8 (306) which occurs after the UL grant is sent, the number of subframes with PDSCH transmission and with PDCCH/EPDCCH indicating DL SPS release which are accounted for is seven. According to FIG. 7 in the drawings, this means that the assigned value of $V_{DAI}^{UL}=3$. So, the eNB sends the value $V_{DAI}^{UL}=3$ in the UL grant on special subframe #6 (304) because, at the instant when the UL grant transmission is performed on special subframe #6, the eNB is aware only of the seven said DL/special subframes with PDSCH/PDCCH/EPDCCH transmission.

In the above scenario, if no miss-detection occurs at the UE side, by the time of sending HARQ feedback on subframe #2 (305), the UE will by then have received a PDSCH/PDCCH/EPDCCH transmission for all eight subframes of the DL association set (307). However, this is more than the number of PDSCH/PDCCH/EPDCCH transmissions which were expected by the UE based on the value of $V_{DAI}^{UL}$ it received in the UL grant. (Recall that the value $V_{DAI}^{UL}=3$ was sent in the UL grant which would indicate to the UE to expect three or seven PDSCH/PDCCH/EPDCCH transmissions, according to FIG. 7). Therefore, even though no miss-detection has in fact occurred, nevertheless the UE will notice that the criterion $V_{DAI}^{UL} \neq (U_{DAI}+N_{SPS}-1) \bmod 4+1$ is met (given that $U_{DAI}=8$ and $N_{SPS}=0$ in this example), and as explained above the UE will therefore generate NACK for all codewords (i.e. NACK will be fed back for all codewords on subframe #2 (305)). However, this is wrong because the UE has correctly detected all PDSCH/PDCCH/EPDCCH transmissions. Therefore, sending NACK for all codewords would simply cause retransmission by the base station unnecessarily (i.e. it causes retransmission by the base station which is not, in fact, required for correct reception of DL-SCH and PDCCH/EPDCCH for SPS release by the UE).

Even if the value of $V_{DAI}^{UL}$ were to be set to a fixed value, such as the value of M following the reference configuration, the problem still exists for TDD HARQ-ACK bundling since the actual total number of DL/special subframes with PDSCH/PDCCH/EPDCCH transmission can be less than M, and thus the criterion $V_{DAI}^{UL} \neq (U_{DAI}+N_{SPS}-1) \mod 4+1$ (i.e. the criterion for causing the UE to generate NACK for all codewords) may still be met.

A proposed DL scheduling restriction implemented at the base station may be used to solve this problem. To be specific, DL PDSCH transmission(s) with corresponding PDCCH/EPDCCH(s), and PDCCH/EPDCCH(s) for SPS release, may be scheduled on subframes within the DL association set, except on "late subframe(s)". In other words, DL PDSCH transmission(s) with corresponding PDCCH/EPDCCH(s), and PDCCH/EPDCCH(s) for SPS release, may be scheduled on "early subframe(s)" only. It will be recalled that "early subframe(s)" are DL/special subframe(s) in a DL association set K which are transmitted by a base station no later than the subframe carrying the UL grant, and "late subframe(s)" are DL/special subframe(s) in a DL association set K which are transmitted by a base station after the subframe carrying the related UL grant.

For SPS PDSCH, however, there may be no need for the above DL scheduling restriction since both UE(s) and eNB(s) are aware of the timing for SPS PDSCH transmission based on the SPS activation PDCCH/EPDCCH and the configured duty cycle. Thus, the value of $V_{DAI}^{UL}$ accounts for the SPS PDSCH transmission in all subframes in the DL association set including the "late subframe(s)", and the UE can detect the SPS PDSCH and feedback the corresponding HARQ-ACK accordingly.

One possible drawback of using DL scheduling restriction as just described is that only SPS PDSCH can be transmitted on "late subframe(s)" (e.g. on DL subframe #8 (306) in frame #n in FIG. 3) because of the DL scheduling restriction. However, it is unlikely that SPS PDSCH alone will make full or best use of all the available resources on the "late subframe(s)" and this may result in somewhat reduced resource efficiency.

TDD HARQ-ACK Multiplexing without Cross-Subframe Scheduling

It should be noted at this point that the character "n" is used in different ways in this document (i.e. the character "n" is used to denote different things). Above, the character "n" is mostly used to refer to a particular radio frame or to distinguish between radio frames (e.g. to distinguish between radio frames (n−1), (n) and (n+1) in FIG. 3, etc). This meaning will also continue to be used below. However, in the discussions below (and also in a number of instances above), the character "n" is also used to denote a particular subframe within a radio frame. Which of these meanings is intended should be apparent from the context.

According to previous proposals for LTE with TDD HARQ-ACK multiplexing operation (3GPP TS 36 213 V8.8.0 (2009-10), §7.3, page 51) "for TDD HARQ-ACK multiplexing and a subframe n with M>1, spatial HARQ-ACK bundling across multiple codewords within a DL subframe is performed by a logical AND operation of all the corresponding individual HARQ-ACKs. In case the UE is transmitting on PUSCH, the UE shall determine the number of HARQ-ACK feedback bits $O^{ACK}$ and the HARQ-ACK feedback bits $o_n^{ACK}$, n=0, . . . , $O^{ACK}-1$ to be transmitted in subframe n. If the PUSCH transmission is adjusted based on a detected PDCCH/EPDCCH with DCI format 0/4 intended for the UE, then $O^{ACK}=V_{DAI}^{UL}$ unless $V_{DAI}^{UL}=4$ and $U_{DAI}+N_{SPS}=0$ in which case the UE shall not transmit HARQ-ACK. For the case with $N_{SPS}>0$, the HARQ-ACK associated with PDSCH transmission without a corresponding PDCCH/EPDCCH is mapped to $o_{o^{ACK}-1}^{ACK}$. The HARQ-ACK feedback bits without any detected PDSCH transmission or without detected PDCCH/EPDCCH indicating downlink SPS release are set to NACK."

For flexible-TDD systems, the value of $V_{DAI}^{UL}$ may not always reflect the total number of subframes with PDSCH/PDCCH/EPDCCH transmission and thus TDD HARQ-ACK multiplexing operation with M>1 can be problematic for reasons discussed previously.

Figure 5:
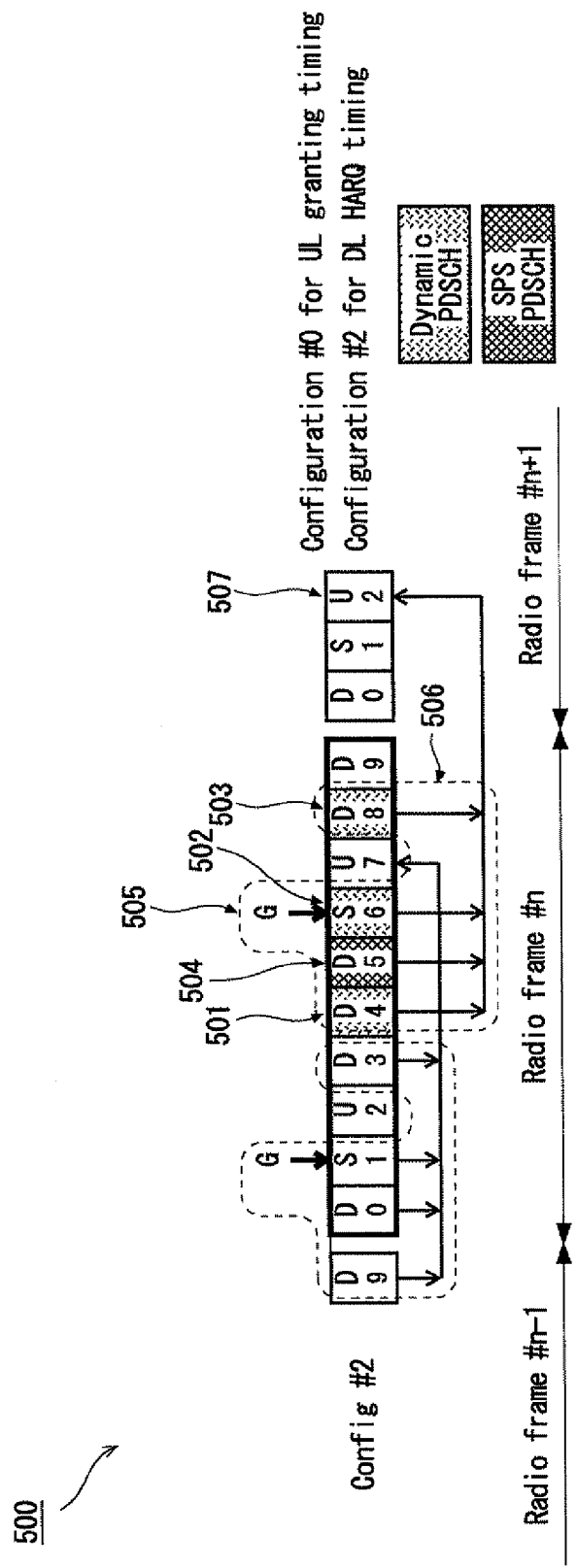
FIG. 5 is another timing diagram which, like FIGS. 2A and 3, is used for illustrative and explanatory purposes.

In FIG. 5, radio frame n is configured with TDD UL-DL configuration #2, and TDD UL-DL configurations #0 and #2 are used for UL scheduling and DL HARQ-timing respectively. As can be seen, the UL grant (505) is not sent on the last DL transmission instance in the DL association set related to UL subframe #2 in radio frame (n+1) (the last DL transmission instance would be the DL subframe #8 in frame (n)).

Let it be assumed that there is a PDSCH transmission with an associated PDCCH/EPDCCH transmission on DL subframe #4 (501), special subframe #6 (502) and DL subframe #8 (503) (i.e. $U_{DAI}=3$), and that there is one PDSCH transmission without an associated PDCCH/EPDCCH transmission on DL subframe #5 (504) (i.e. $N_{SPS}=1$). In this situation, the value $V_{DAI}^{UL}=3$ which is included in UL Grant (505) sent by the base station is determined using only the PDSCH/PDCCH/EPDCCH transmissions on the first three subframes in the DL association set (506). Since the base station (or eNB) knows of DL transmissions in four subframes {4, 5, 6, 8}, on UL subframe #2 (507) in radio frame (n+1) the base station/eNB expects to receive HARQ-ACK bits in the order $\{o_{DLsubframe\#4}^{ACK}, o_{DLsubframe\#6}^{ACK}, o_{DLsubframe\#8}^{ACK}, o_{DLsubframe\#5}^{ACK}\}$ with HARQ-ACK feedback for SPS PDSCH being the last one (as per the previous proposals for LTE with TDD HARQ-ACK multiplexing discussed above). However, at the UE side, on UL subframe #2 (507), HARQ-ACK bits are set in the order of $\{o_{DLsubframe\#4}^{ACK}, o_{DLsubframe\#6}^{ACK}, o_{DLsubframe\#5}^{ACK}\}$ because the UE uses $V_{DAI}^{UL}=3$ following the procedure outlined in the Background section above. This may result in the following error: the eNB may take $o_{DLsubframe\#5}^{ACK}$ as the HARQ-ACK for DL subframe #8 (503). The eNB may therefore interpret that the SPS PDSCH on DL subframe #5 (504) was miss-detected by the UE (even if it was not).

In order to solve this problem for TDD HARQ-ACK multiplexing with M>1, the value of $V_{DAI}^{UL}$ included in the UL Grant can be deliberately set by the base station/eNB to the value of M, without any consideration for the total number of subframes with PDSCH transmission and with PDCCH/EPDCCH indicating DL SPS release. In this manner, the eNB deliberately indicates to the UE that there is a PDSCH/PDCCH/EPDCCH transmission on each DL/special subframe in the DL association set, and the HARQ-ACK feedback bits for any DL subframe(s) on which the UE did not detect PDSCH transmission or PDCCH/EPDCCH indicating downlink SPS release are set to NACK. Thus, in the example situation described in the previous paragraph and referring to timing diagram (500) in FIG. 5, the value of $V_{DAI}^{UL}$ would be set to the value of M=4, and the HARQ-ACK bits fed back by the UE would be in the order $\{o_{DLsubframe\#4}^{ACK}, o_{DLsubframe\#6}^{ACK}, o_{DLsubframe\#8}^{ACK}, o_{DLsubframe\#5}^{ACK}\}$, which is exactly the order expected by the eNB.

As can be seen, according to this proposal, M-bit HARQ feedback is always sent by the UE regardless of how many DL/Special subframes there are with PDSCH/PDCCH/EPDCCH transmission. However, one possible downside of this (i.e. a possible downside of the base station deliberately setting the value of $V_{DAI}^{UL}$ included in the UL Grant to the value of M) is that it may sometimes introduce the need for redundant resources to carry NACK(s) for non-existing DL transmission(s).

As can be understood from the discussion above, different methods may thus be selected for different HARQ-ACK feedback modes. DL scheduling restriction may be used where TDD HARQ-ACK bundling is in operation (although this may be at the cost of low/reduced spectrum efficiency in "late subframe(s)"). Setting $V_{DAI}^{UL}$ to the value of M may be used where HARQ-ACK multiplexing is in operation (although this may be at the cost of redundant NACK transmission(s) for non-existing DL transmission(s)).

In any case, since the feedback mode is higher layer configured, the base station/eNB is aware of the feedback mode of each UE and thus the appropriate operation can be implemented at the eNB for different UEs accordingly.

TDD HARQ-ACK Bundling and/or Multiplexing with Cross-Subframe Scheduling

In cross-subframe scheduling "the control region may contain control channels that schedule a UE in some particular single subframe (either the current subframe or one of the following subframes)". In another words, instead of transmitting a PDSCH and the associated PDCCH/EPDCCH on the same DL/special subframe, a PDSCH transmitted on subframe #(n+j) can be cross-subframe scheduled by transmitting the corresponding PDCCH/EPDCCH j subframe(s) earlier on subframe #n.

Figure 6:
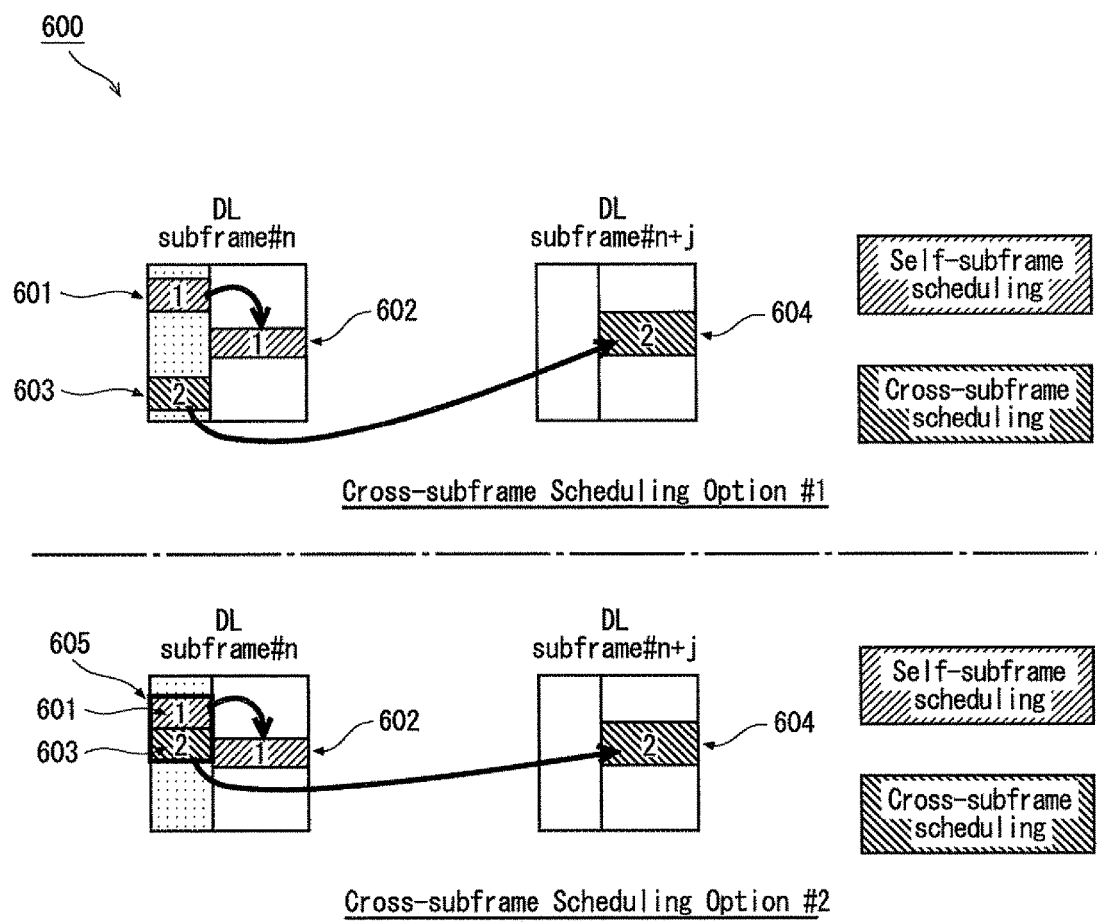
FIG. 6 schematically illustrates to possible options for cross-subframe scheduling.

There may be more than one method for implementing cross-subframe scheduling in flexible TDD systems and FIG. 6 illustrates two possible options. In reference to FIG. 6, for cross-subframe scheduling option #1, the PDCCH/EPDCCH (601) associated with PDSCH transmission (602) in subframe #n, and the PDCCH/EPDCCH (603) associated with PDSCH transmission (604) in subframe #(n+j), are independently encoded and transmitted as independent PDCCH/EPDCCHs. For cross-subframe scheduling option #2, the PDCCH/EPDCCH (601) associated with PDSCH transmission (602) in subframe #n, and the PDCCH/EPDCCH (603) associated with PDSCH transmission (604) in subframe #(n+j), are jointly encoded and transmitted on a single PDCCH/EPDCCH (605). For flexible TDD or eIMTA systems, a PDSCH which is transmitted in a "late subframe" can thus be cross-subframe scheduled on an "early subframe" within the same DL association set. That is, for a PDSCH transmitted on a "late subframe", the PDCCH/EPDCCH associated with that PDSCH transmission can be transmitted on an "early subframe" of the same DL association set.

Thus, referring to the timing diagram (300) in FIG. 3, a dynamically scheduled PDSCH can be transmitted on DL subframe #8 (306) in frame #n, with the associated PDCCH/EPDCCH sent on DL/special subframe #6 (304) or on any other "early subframe" in the DL association set (307) related to UL subframe #2 in frame #(n+1). Since the PDCCH/EPDCCH is transmitted on an "early subframe", it can be counted and reflected in the UL grant (304) sent by the base station/eNB on subframe #6.

Importantly, in previously proposed LTE, the 2-bits field $V_{DAI}^{UL}$ sent to the UE in the UL grant is determined according to the total number of DL subframe(s) with PDSCH transmissions and with PDCCH/EPDCCH indicating downlink SPS release within the DL association set. However, if cross-subframe scheduling is implemented, it will be possible to have PDSCH (with or without corresponding PDCCH/EPDCCH) and also cross-subframe scheduled PDCCH/EPDCCH (i.e. PDCCH/EPDCCH associated with a PDSCH sent in a future subframe) all in the same DL subframe. Thus, merely counting the number of subframes will no longer be sufficient to notify the UE of the total number of expected PDSCH/PDCCH/EPDCCH.

As a result, the definition of $V_{DAI}^{UL}$ will need to be changed to accommodate cross-subframe scheduling (i.e. to accommodate the inclusion in "early subframe(s)" of PDCCH/EPDCCH(s) associated with PDSCH(s) sent on future subframe(s) of the same DL association set). Thus, $V_{DAI}^{UL}$ should be defined as the total number of: (i) PDSCH transmissions; (ii) PDCCH/EPDCCH(s) for PDSCH(s) which are cross-subframe scheduled to occur in future subframe(s); and (iii) PDCCH/EPDCCH transmissions indicating downlink SPS release; sent to the UE within the DL association set.

In LTE-TDD systems with cross-subframe scheduling enabled, there could be more than one PDCCH/EPDCCH transmission in one DL subframe. For example, there could be one PDCCH/EPDCCH for self-subframe scheduling (i.e. a PDCCH/EPDCCH associated with a PDSCH which is also sent in that same subframe) and there could also be one PDCCH/EPDCCH for cross-subframe scheduling (i.e. the latter PDCCH/EPDCCH being associated with a PDSCH to be sent in a future subframe of the DL association set). Referring to FIG. 6 by way of further explanation, assuming there are only two subframes in the DL association set, in DL subframe #n, PDCCH/EPDCCH 1 (601) is transmitted for self-subframe scheduling of PDSCH 1 (602) and PDCCH/EPDCCH 2 (603) is transmitted for cross-subframe scheduling of PDSCH 2 (604) transmitted in DL subframe #(n+j).

An additional 2-bit subframe indicator field (SIF) included in DL DCI could provide enough flexibility for selecting any DL/special subframe within the same DL association set for cross-subframe scheduling. For example, in FIG. 6, SIF=0 in PDCCH/EPDCCH 1 (601) could indicate self-subframe scheduling, whereas SIF=1 in PDCCH/EPDCCH 2 (603) could indicate cross-subframe scheduling and the cross-scheduled subframe may be the second subframe in the DL association set.

More specifically, an additional 2-bits field included in DL DCI for cross-subframe scheduling can be used to indicate the offset of subframes in the DL association set for LTE-TDD systems. For LTE-FDD systems, the additional 2-bits field can be used to indicate the time-offset between PDCCH/EPDCCH and the cross-subframe scheduled PDSCH.

However, introducing additional bits in existing DCI, or introducing a new DCI to accommodate the subframe indicator field (SIF), may not be preferable (these may even be options of last resort). Seeking another alternative with the less impact on the existing standard specification may be more desirable. As one possible alternative, therefore, existing DL DCI may be used for cross-subframe scheduling, and the usage of the DL DCI (i.e. whether the DL DCI is used for self-subframe or cross-subframe scheduling) may be distinguished by a mask on CRC of the received DL DCI.

According to previous LTE proposals, "the entire PDCCH/EPDCCH payload is used to calculate the CRC parity bits. Denote the bits of the PDCCH/EPDCCH payload $a_0, a_1, \ldots, a_{A-1}$ where A is the PDCCH/EPDCCH payload size, and the parity bits are $p_0, p_1, \ldots, p_{L-1}$ where L is the number of parity bits".

When cross-subframe scheduling is configured and applicable, after CRC attachment, the CRC parity bits in DL DCI may be scrambled with a cross-subframe scheduling mask $x_0, x_1, \ldots, x_{15}$ as proposed in FIG. 8 in the drawings, and corresponding radio network temporary identities (RNTI)

$x_{rnti,0}, x_{rnti,1}, \ldots, x_{rnti,15}$ may be used to form the sequence of bits $c_0, c_1, \ldots, c_{A+L}$. The relationship between $c_k$ and $a_k$ is:

$$c_k = a_k \text{ for } k=0,1,2,\ldots,A-1$$

$$c_k = (a_k + x_{rnti,k-A} + x_{k-A}) \bmod 2 \text{ for } k=A, A+1, A+2, \ldots, A+15$$

At the UE side, after PDCCH/EPDCCH decoding, two cross-subframe scheduling masks, as proposed in FIG. 8, may be used for CRC checking. If the CRC checking passes, whether the DCI has been used for cross-subframe scheduling or for self-subframe scheduling can be ascertained based on the mask determined to have been used (the mask determined to have been used will be the mask which allows the CRC check to pass).

The following is another alternative. According to previous proposals for LTE, there is a 2-bit transmit power control (TPC) field in each DL DCI which is used to adjust the transmission power of PUCCH. For the case where all uplink control information (UCI) is transmitted on PUSCH, the information in the TPC field is ignored. Furthermore, since the DL & UL timing coupling problem for eIMTA systems only happens when HARQ feedback is transmitted on PUSCH, it follows that the 2-bit TPC field for PUCCH power control is always unused and can therefore be used for other purposes.

With reference to timing diagram (300) in FIG. 3, the eNB sends an UL grant on subframe #6 (304) in radio frame #n which schedules UL transmission of PUSCH on UL subframe #2 (305) of the next radio frame (n+1), and on the same subframe #6 (304) the eNB sends a scheduling DL DCI for DL transmission scheduling. On subframe #6 (304), as the eNB can tell whether there is to be a PUCCH transmission by the corresponding UE on UL subframe #2 (305), if there is no PUCCH transmission for the corresponding UE on UL subframe #2 (305), the TPC field on DL DCI sent on subframe #6 (304) (which was originally designed for PUCCH power control) is not used, and it can be reinterpreted for cross-subframe scheduling purposes. For instance, to indicate the location of the subframe on which a related PDSCH will be transmitted (the PDSCH being associated with a transmitted and cross-subframe scheduled PDCCH/EPDCCH).

Referring again to timing diagram (300) in FIG. 3, the eNB sends an UL grant on subframe #6 (304) in radio frame #n which schedules UL transmission of PUSCH on UL subframe #2 (305) of the next radio frame (n+1), and on the same subframe #6 (304) the eNB sends a scheduling DL DCI for DL transmission scheduling. On subframe #6 (304), as the eNB can tell whether there is to be PUCCH transmission by the corresponding UE on UL subframe #2 (305), if there is to be a PUCCH transmission by the corresponding UE on UL subframe #2 (305), the proposal to use two 16-bit sequences as a masks for CRC checking etc (as discussed above) can be combined with the proposal to use the 2-bit TPC field in DL DCI for cross-subframe scheduling purposes (as also discussed above). Combining these two proposals may allow power control for PUCCH and/or cross-subframe scheduling. That is, the first said proposal provides a means for the UE to distinguish PDCCH/EPDCCH for self-scheduling from PDCCH/EPDCCH for cross-subframe scheduling. And, according to the second said proposal, the TPC field in the PDCCH/EPDCCH for self-scheduling is used for PUCCH power control, where TPC field in the PDCCH/EPDCCH for cross-subframe scheduling is used for indicating subframe for PDSCH transmission.

In LTE systems with cross-subframe scheduling enabled, there could be more than one DL DCI transmitted within the same DL/Special subframe, and it is important for the UE to know which DL DCI is used for self-scheduling, and which DL DCI is used for cross-subframe scheduling. Besides the 2-TPC bits in DL DCI which can be used to indicate the subframe scheduled for the PDSCH, 2-bits field Downlink Assignment Index (DL DAI) for LTE-TDD systems can also be used to further verify whether the DL DCI is used for self-scheduling or cross-subframe scheduling. In this regard, for LTE-TDD systems, 2-bits field Downlink Assignment Index (DL DAI) is present in all DL DCI for all TDD UL-DL configurations. According to previous proposals for LTE, "the value of DL DAI denotes the accumulative number of PDCCH/EPDCCH(s) with assigned PDSCH transmissions(s) and PDCCH/EPDCCH indicating downlink SPS release up to the present subframe within the DL association set."

With reference to FIG. 6, the DL DAI value in PDCCH/EPDCCH 1 (601) is set "1" and the DL DAI value in PDCCH/EPDCCH 2 (603) is set "2", and since there should be no more than one self-scheduled PDSCH transmissions in one DL/special subframe, the UE knows PDCCH/EPDCCH 2 (603) is for cross-subframe scheduling and PDCCH/EPDCCH 1 (601) is for self-subframe scheduling. Hence, the DL DAI value in DCI for self-subframe scheduling can be counted before the DL DAI in DCI for cross-subframe scheduling In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australia Patent Application No. 2013902001, filed on Jun. 4, 2013, the disclosure of which is incorporated herein in its entirety by reference.

REFERENCE SIGNS LIST

100,200,200A,300,500 DIAGRAM
110,120 TABLE
400 ADVANCED WIRELESS COMMUNICATION SYSTEM
401 BASE STATION/eNB
402,431 TDD RECONFIGURATION PROCESSING
420 LEGACY UE(s)
430 Rel. 12 & BEYOND UE(s)

The invention claimed is:

1. A signaling method for use in a wireless communication system that supports flexible allocation of time division duplex (TDD) uplink-downlink (UL-DL) configurations and in which hybrid automatic repeat request acknowledgement (HARQ-ACK) bundling is used, the method comprising:
allocating one of a plurality of TDD UL-DL configurations for use on a given radio frame, wherein for a given TDD UL-DL configuration:
an UL subframe carries HARQ-ACK feedback for one or more DL and/or special subframes in the given radio frame and/or a previous radio frame,
a DL association set comprises the one or more DL and/or special subframes for which HARQ-ACK feedback is carried in the said UL subframe; and
an UL grant for the said UL subframe is sent on one of the DL and/or special subframes in the DL association set; and
the method also comprising scheduling
(enhanced) physical downlink control channel (PDCCH/EPDCCH) transmissions indicating DL semi-persistent scheduling (SPS) release and/or
physical downlink shared channel (PDSCH) transmissions with corresponding PDCCH/EPDCCH
only on DL and/or special subframes in the DL association set which are not after the subframe carrying the UL grant.

2. The method claimed in claim 1 further comprising scheduling SPS PDSCH transmission(s) on subframe(s) in the DL association set which are not after the UL grant subframe and/or on subframe(s) in the DL association set which are after the UL grant subframe.

3. The method claimed in claim 1 wherein the wireless communication system comprises an advanced base station (eNB), one or more advanced user equipments (UEs) and one or more legacy UEs, and the method further comprises
allocating a TDD UL-DL configuration for advanced UE(s) which are operable according to a flexible TDD allocation, and
allocating a TDD UL-DL configuration for legacy UE(s) which operate according to a long-term TDD allocation, wherein the TDD UL-DL configuration allocated for legacy UE(s) is the same or different to the TDD UL-DL configuration allocated for advanced UE(s).

4. The method claimed in claim 1 further comprising cross-subframe scheduling wherein, for a PDSCH transmission on a particular subframe, the corresponding PDCCH/EPDCCH associated with that PDSCH transmission is sent in a different subframe.

5. A signaling method for use in a wireless communication system that supports flexible allocation, by a base station (eNB), of TDD UL-DL configurations for use in signaling between the eNB and an advanced UE, and wherein HARQ-ACK multiplexing is used, the method comprising:
allocating one of a plurality of TDD UL-DL configurations for use on a given radio frame, wherein for a given TDD UL-DL configuration:
an UL subframe carries HARQ-ACK feedback for a plurality of DL and/or special subframes in the given radio frame and/or a previous radio frame,
a DL association set comprises the plurality of DL and/or special subframes for which HARQ-ACK feedback is carried in the said UL subframe; and
an UL grant for the said UL subframe is sent on one of the DL and/or special subframes in the DL association set; and the method also comprises:
setting the value of a DL assignment index ($V_{DAI}^{UL}$) to the number of subframes in the DL association set; and
transmitting $V_{DAI}^{UL}$ from the eNB to the advanced UE in the UL grant, where $V_{DAI}^{UL}$ indicates the total number of expected subframes with PDCCH/EPDCCH(s) associated with PDSCH transmission(s) and PDCCH/EPDCCH transmission(s) indicating DL SPS release in the DL association set.

6. The method claimed in claim 5 wherein
the UE determines the number of HARQ-ACK feedback bits $O^{ACK}$ and the HARQ-ACK feedback bits $o_n^{ACK}$, n=0, ..., $O^{ACK}$−1 to be transmitted in the UL subframe,
for any SPS PDSCH transmission without a corresponding PDCCH/EPDCCH which is received by the UE, the associated HARQ-ACK feedback bit is mapped to $o_{o^{ACK}-1}^{ACK}$, and HARQ-ACK feedback bits for any DL and/or special subframes on which the UE did not detect a PDSCH transmission or a PDCCH/EPDCCH indicating DL SPS release are set to NACK.

7. The method as claimed in claim 5 wherein there are one or more advanced UEs, and the wireless communication system further includes one or more legacy UEs, the method further comprising
allocating a TDD UL-DL configuration for advanced UE(s) which are operable according to a flexible TDD allocation, and
allocating a TDD UL-DL configuration for legacy UE(s) which operate according to a long-term TDD allocation, wherein the TDD UL-DL configuration allocated for legacy UE(s) is the same or different to the TDD UL-DL configuration allocated for advanced UE(s).

8. The method claimed in claim 5 further comprising cross-subframe scheduling wherein, for a PDSCH transmission on a particular subframe, the corresponding PDCCH/EPDCCH associated with that PDSCH transmission is sent in a different subframe.

9. A wireless communication system which operates according to the method claimed in claim 1.

10. A base station operable to perform the method claimed in claim 1.

11. A signaling method for use in a wireless communication system that supports flexible allocation of TDD UL-DL configurations, the method comprising:
cross-subframe scheduling wherein, for a PDSCH transmission on a particular subframe, the corresponding PDCCH/EPDCCH associated with that PDSCH transmission is sent in a different subframe;
allocating one of a plurality of TDD UL-DL configurations for use on a given radio frame, wherein for a given TDD UL-DL configuration:
an UL subframe carries HARQ-ACK feedback for one or more DL and/or special subframes in the given radio frame and/or a previous radio frame,
a DL association set comprises the one or more DL and/or special subframes for which HARQ-ACK feedback is carried in the said UL subframe; and
an UL grant for the said UL subframe is sent on one of the DL and/or special subframes in the DL association set.

12. The method claimed in claim 11 wherein, for a PDSCH transmission on a subframe in the DL association set which is after the UL grant subframe, the corresponding PDCCH/EPDCCH associated with that PDSCH transmission is cross-subframe scheduled and sent on a subframe in the DL association set which is not after the UL grant subframe.

13. The method claimed in claim 11 further comprising transmitting a DL assignment index ($V_{DAI}^{UL}$) in the UL grant, wherein $V_{DAI}^{UL}$ indicates the total number of the following sent to an advanced UE within the DL association set:
   PDSCH transmission(s);
   (ii) cross-subframe scheduled PDCCH/EPDCCH(s) on subframe(s) not after the UL grant subframe which correspond to PDSCH(s) on subframe(s) after the UL grant subframe; and
   (iii) PDCCH/EPDCCH transmission(s) indicating DL SPS release.

14. The method claimed in claim 11 wherein a given DL or special subframe in the DL association set can contain one or both of:
   a self-subframe scheduled PDCCH/EPDCCH being a PDCCH/EPDCCH associated with a PDSCH transmission where the PDSCH is included on the same subframe, in which case there is a zero subframe offset between the PDSCH transmission and the associated PDCCH/EPDCCH, and
   a cross-subframe scheduled PDCCH/EPDCCH being a PDCCH/EPDCCH associated with a PDSCH transmission where the PDSCH is on a different subframe, in which case there is a non-zero subframe offset between the PDSCH transmission and the associated PDCCH/EPDCCH.

15. The method claimed in claim 14 wherein a new downlink control information (DCI) is provided which includes a 2-bit subframe indicator field (SIF) for indicating the subframe offset.

16. The method claimed in claim 15 wherein, in LTE-TDD systems, the 2-bit SIF is used to indicate the number of subframes of the subframe offset.

17. The method claimed in claim 15 wherein, in LTE-FDD systems, the 2-bit SIF is used to indicate the subframe offset between a PDSCH transmission and the associated cross-subframe scheduled PDCCH/EPDCCH as one or both of (i) a time offset or (ii) an offset expressed in terms of subframe index or difference in subframe index.

18. The method claimed in claim 14 wherein an existing DCI is used, and whether the said DCI is used for self-subframe scheduling or cross-subframe scheduling is determined using a mask on the cyclic redundancy check (CRC) of the received DCI.

19. The method claimed in claim 18 wherein, after PDCCH/EPDCCH decoding, one of two masks is used for CRC checking, and if the CRC checking passes, whether the DCI has been used for cross-subframe scheduling or for self-subframe scheduling can be ascertained based on which one of the masks is determined to have been used.

20. The method claimed in claim 19 wherein
   the entire PDCCH/EPDCCH payload is used to calculate CRC parity bits, the bits of the PDCCH/EPDCCH payload being $a_0, a_1, \ldots, a_{A-1}$ where A is the PDCCH/EPDCCH payload size, and the parity bits being $p_0, p_1, \ldots, p_{L-1}$ where L is the number of parity bits,
   the CRC parity bits in DCI are scrambled with either a self-subframe scheduling or cross-subframe scheduling mask $x_0, x_1, \ldots, x_{15}$ as shown in the table

| Cross-subframe scheduling flag | mask $\langle x_0, x_1, \ldots, x_{15} \rangle$ |
|---|---|
| Self-subframe scheduling | <0, 0, 0, 0, 0, 0, 0, 0, 0, 0, 0, 0, 0, 0, 0, 0> |
| Cross-subframe scheduling | <0, 0, 0, 1, 0, 0, 0, 1, 0, 0, 0, 1, 0, 0, 0, 1> | and corresponding radio network temporary identities (RNTI) $x_{rnti,0}, x_{rnti,1}, \ldots, x_{rnti,15}$ are used to form a sequence of bits $c_0, c_1, \ldots, c_{A+L}$, where $$c_k = a_k \text{ for } k=0,1,2,\ldots,A-1$$

$$c_k = (a_k + x_{rnti,k-A} + x_{k-A}) \bmod 2 \text{ for } k=A, A+1, A+2, \ldots, A+15.$$

21. The method claimed in claim 14 wherein an existing DCI is used which includes a 2-bit transmit power control (TPC) field originally intended for adjusting the transmission power of PUCCH, wherein the said 2-bit TPC field is instead used to indicate subframe offset or the location of the subframe for a PDSCH corresponding to a cross-subframe scheduled PDCCH/EPDCCH.

22. The method claimed in claim 14 wherein an existing DCI is used which includes a 2-bit DL assignment index (DAI) and more than one DL DCI can be transmitted within the same DL/special subframe, and wherein the DAI value in the DCI for self-scheduling is counted before the DL DAI in DCI for cross-subframe scheduling.

* * * * *